US00RE34944E

United States Patent [19]

Yamane

[11] E Patent Number: Re. 34,944

[45] Reissued Date of Patent: May 16, 1995

[54] THERMO-SENSITIVE TRANSFER INK RIBBON TO BE USED FOR PRODUCING DRY TYPE TRANSFER MATERIAL

[75] Inventor: Mitsuo Yamane, Wrexham Clwyd, United Kingdom

[73] Assignee: Brother Kogyo Kabushiki Kaisha, Aichi, Japan

[21] Appl. No.: 980,205

[22] Filed: Nov. 23, 1992

Related U.S. Patent Documents

Reissue of:

[64] Patent No.: 5,024,887
Issued: Jun. 18, 1991
Appl. No.: 299,232
Filed: Jan. 23, 1989

[30] Foreign Application Priority Data

Jan. 21, 1988 [JP] Japan ..... 63-11631

[51] Int. Cl.[6] ..... B32B 27/14

[52] U.S. Cl. ..... 428/335; 428/195; 428/323; 428/336; 428/412; 428/419; 428/474.4; 428/480; 428/484; 428/488.1; 428/488.4; 428/492; 428/497; 428/500; 428/537.5; 428/913; 428/914

[58] Field of Search ..... 428/195, 484, 488.4, 428/488.1, 913, 914, 323, 335, 336, 500, 537.5, 412, 419, 474.4, 480, 492, 497

[56] References Cited

U.S. PATENT DOCUMENTS 4,698,268 10/1987 Ueyama .
4,870,427 9/1989 Kobayashi et al. ..... 346/1.1

FOREIGN PATENT DOCUMENTS 128990 6/1988 Japan .

*Primary Examiner*—Patrick J. Ryan
*Assistant Examiner*—W. Krynski
*Attorney, Agent, or Firm*—Oliff & Berridge

[57] ABSTRACT

Disclosed is a thermo-sensitive transfer ink ribbon to be used for producing a dry type transfer material, which is constituted by: a ribbon substrate material; an ink layer formed on a surface of the substrate material and containing a coloring agent, a binder agent, a pressure-sensitive adhesive in the form of dispersion of fine particles; and a transfer property control layer formed on the ink layer and containing a thermo-sensitive adhesive and a tackiness agent. Further disclosed is a method of producing the thermo-sensitive transfer ink ribbon which comprises the steps of: dissolving/dispersing a coloring agent, a binder agent, and a pressure-sensitive adhesive in a predetermined solvent; applying the solvent onto a surface of a ribbon substrate material so as to form an ink layer on the surface; and coating the ink layer with a mixture in which a thermo-sensitive adhesive and a tackiness agent are mixed with each other in the form of a predetermined solution or dispersion liquid.

33 Claims, 1 Drawing Sheet

THERMO-SENSITIVE TRANSFER INK RIBBON TO BE USED FOR PRODUCING DRY TYPE TRANSFER MATERIAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a thermo-sensitive transfer ink ribbon to be used in producing a dry type transfer material for thermally transferring an ink image from the surface thereof onto a target transferring material by using a printer, a typewriter, a word processor, or the like, of the thermo-sensitive transfer system. The present invention further relates to a method of producing such a thermo-sensitive transfer ink ribbon.

2. Description of the Prior Art

Recently, printing apparatus such as a printer, a typewriter, a word processor, etc., of the thermo-sensitive transfer system has been developed, and used widely from in a field of small-scaled personal use to in a field of large-scaled business use. Printing according to this thermo-sensitive transfer system is performed in such a manner that a thermo-sensitive transfer ink ribbon is made to come into close contact with predetermined printing paper by a thermal head and selected ones of a large number of heating resistor elements of the thermal head are energized so as to fuse heat-fusible ink portions contacting with the selected heating resistor elements through a support of the thermo-sensitive transfer ink ribbon so that an ink image is thereby transferred onto the printing paper.

Such a conventional thermo-sensitive transfer ink ribbon of the type as described above, however, has been formed of a predetermined support coated with only heat-fusible ink composed of a coloring agent and a binder agent which contains wax as a principal component. Further, the thermo-sensitive transfer ink ribbon of the type as described above has been utilized only when ordinary paper is used as a target material for transfer.

Recently, as the thermally-sensitive transfer system has been popularized, an improvement in property of transfer to rough paper (paper having low smoothness) has been required, and various patent applications related to the foregoing requirement have been filed. Further, there have been proposed various techniques, for example, related to a multi-time ribbon with which transfer and printing can be repeatedly performed by using one and the same ink ribbon, a correctable ribbon with which errors in printing can be erased and corrected, and so on.

As far as the inventors of this application know, however, any report has not been given as to a thermo-sensitive ink ribbon for making it possible to perform transfer and printing onto a surface having poor wettability and having good mold-releasing and peeling properties. Moreover, since the thermo-sensitive transfer system has not been used at all as means for producing a dry type transfer material for use for instant lettering, there has been proposed no thermo-sensitive transfer ink ribbon to be used for producing a dry type transfer material for use for instant lettering. Accordingly, it is a matter of course that there has been proposed no method of producing such a thermo-sensitive transfer ink ribbon to be used for producing a dry type transfer material for use for instant lettering.

In order to perform thermo-sensitive transfer of an image on a printing surface having poor wettability and having a good mold releasing property, the printing surface is required to be separated from an ink ribbon before ink has been dried. To this end, it is necessary that thermal efficiency of a thermo-sensitive transfer apparatus is improved or an energy applied thereto is increased, or, alternatively, that ink is lowered in its melting point, fusion viscosity, and cohesion strength. It is not easy to increase the thermal efficiency of a thermo-sensitive transfer apparatus and there is a limit in increasing the thermal efficiency. Further, there is also a limit in increasing the energy for the thermo-sensitive transfer apparatus. On the contrary, in the existing circumstances, it is desired to reduce the energy, in view of the life of a head and a load to the apparatus. Regarding the ink, on the other hand, in the case of using ink having a low melting point, low fusion viscosity, and small cohesion strength, there is a problem in that a thermo-sensitive transfer image is spread, the ink is raked up by pressure of a head, or at the time of pressure-sensitive transfer, the image is partially transferred or is extended.

SUMMARY OF THE INVENTION

It is therefore an object of the present invention to solve the foregoing problems in the prior art.

It is another object of the present invention to make it possible that thermo-sensitive transfer of an ink image having viscosity and cohesion strength which are considerably high and large to an extent so as not to cause any problem is performed onto a surface having poor wettability and a good mold releasing property without increasing any load to a thermo-sensitive transfer apparatus.

In order to attain the above objects, according to an aspect of the present invention, the thermo-sensitive transfer ink ribbon to be used for producing a dry type transfer material substantially comprises: a ribbon substrate material; an ink layer formed on one of opposite surfaces of the substrate material and containing a coloring agent, a binder agent, and a pressure-sensitive adhesive which exist in the form of dispersion of fine particles; and a transfer property control layer formed on the ink layer and containing a thermo-sensitive adhesive and a tackiness agent.

According to another aspect of the present invention, the method of producing the thermo-sensitive transfer ink ribbon used for producing a dry type transfer material comprises the steps of: preparing a coloring agent, a binder agent, and a pressure-sensitive adhesive at a ratio of 5–30:40–93:2–30 by weight; dissolving/dispersing the prepared coloring agent, binder agent, and pressure-sensitive adhesive in a predetermined solvent; applying the solvent containing the coloring agent, binder agent, and pressure-sensitive adhesive onto a surface of a ribbon substrate material so as to form an ink layer on the surface; and coating the ink layer with a mixture in which a thermo-sensitive adhesive and a tackiness agent are mixed with each other at a composition ratio within a range of from 1:095 to 1:10 in the state where the mixture is dissolved or dispersed in water or in an organic solvent which does not harm the ink layer.

BRIEF DESCRIPTION OF THE DRAWINGS

Other features and advantages of the present invention will be apparent from the following description taken in connection with the accompanying drawings, wherein.

DETAILED DESCRIPTION OF THE INVENTION

Figure 1:
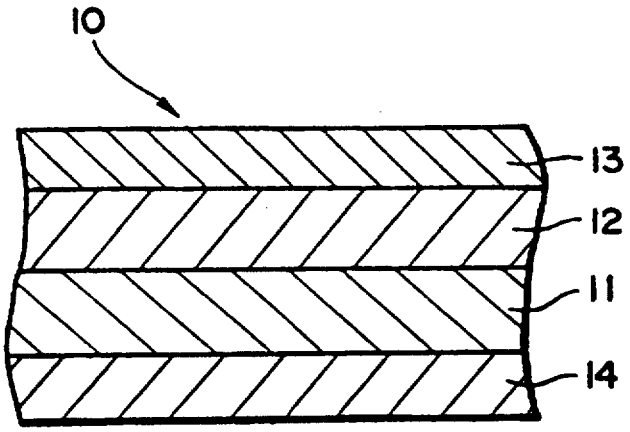
FIG. 1 is a sectional view illustrating an embodiment of the thermo-sensitive transfer ink ribbon to be used for producing a dry type transfer material, according to the present invention.
Figure 2:
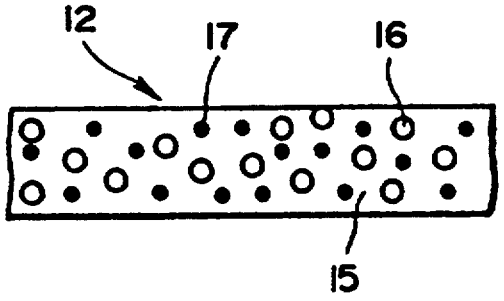
FIG. 2 is a sectional view showing in detail the ink layer of the ink ribbon of FIG. 1.

The present invention will be described more in detail with reference to the accompanying drawings in which the reference numeral 10 designates a thermo-sensitive transfer ink ribbon, 11 designates a ribbon substrate material, 12 designates an ink layer, 13 designates a transfer property control layer, 14 designates a sticking prevention layer, 15 designates soluble components, 16 designates deposition of fine particle components, and 17 designates a coloring agent.

Referring to FIG. 1, the thermo-sensitive transfer ink ribbon according to the present invention has a structure in which the ink layer 12 is formed on one of the opposite surfaces of the film-like ribbon substrate material or support 11 and the transfer property control layer 13 is formed on the ink layer 12 to a predetermined thickness. Further, the sticking prevention layer 14 of heat-resistant resin such as silicone resin or the like is formed on the other surface of the ribbon substrate material 11 opposite to the one surface coated with the ink layer 12.

In the thermo-sensitive transfer ink ribbon 10 to be used for producing a dry type transfer material as described above, as the film-like ribbon substrate material 11 for supporting the ink layer 12, it is possible to use any kind of conventionally used thermo-sensitive transfer ink ribbon substrate material. It is however preferable to use a resin film made of, for example, polyester polyimide, polycarbonate, polysulfone, polyethersulfone, polyphenylenesulfite, etc., condenser paper, glassine paper, or the like, having a heat-resistant temperature not lower than 150° C., because an ink ribbon is made to contact with a thermal head of a printing apparatus for the purpose of performing thermo-sensitive transfer of an ink image. It is generally desirable to select the thickness of the ribbon substrate material 11 to be within a range of from 3 $\mu$m to 20 $\mu$m, although the thickness may be suitably selected in accordance with the kind of the material.

The ink layer 12 is composed mainly of a coloring agent, a binder agent, and a pressure-sensitive adhesive. As the coloring agent, although pigment such as carbon black or the like is mainly used, suitable dye may be added to the pigment to adjust color tone, if necessary.

As the binder agent constituting the ink layer 12, mainly used is a binder agent composed of wax and a tackiness agent. The wax may be one or more kinds matters selected from: vegetable wax such as candelilla wax, carnauba wax, rice wax, Japan wax, etc.; animal wax such as beeswax, lanolin, whale wax, etc.; mineral wax such as montan wax, ceresin, etc.; and petroleum wax such as paraffin wax, micro-crystalline wax, etc. The tackiness agent may be, for example, petroleum resin, rosin resin, ketone resin, polyamide resin, phenol resin, or the like. As the foregoing wax, also resin wax such as $\alpha$-olefin-maleic anhydride copolymers may be used. The tackiness agent acts to improve the adhesion and hardness of ink, to give cohesion and tacking strength to the ink, and to give tackiness to the pressure-sensitive adhesive. The wax and tackiness agent constituting the binder agent are mixed with each other generally at a ratio within a range of from about 15:1 to 3:2 by weight.

The pressure-sensitive adhesive constituting the ink layer 12 may be composed of one or more kinds of matters in combination selected from a group consisting of: vinyl macromolecules such as polyvinyl chloride, polyacrylic ester, ethylene-vinyl acetate copolymers, ethylene-ethylacrylate copolymers, polyvinyl acetate, polyvinyl ether, polyvinyl acetal, polyisobutylene, etc.; fiber macromolecules such as ethylcellulose, cellulose acetate, etc.; and rubber macromolecules such as chlorinated rubber, natural rubber, etc.

The coloring agent, binder agent, and pressure-sensitive adhesive constituting the ink layer 12 are mixed with each other generally at a ratio within a range of about 5–30:40–93:2–30 so as to form an ink liquid preferably having viscosity lower than 3,000 cP, more preferably about 200–1000 cP, at a temperature of 95° C.

The transfer property control layer 13 formed on the ink layer 12 as a top coating layer is arranged so as to have viscosity higher than that of the ink layer 12 (under a condition of thermo-sensitive transfer), and so as to have a thermo-sensitive adhering property, hardness, and cohesion strength which are larger than those of the ink layer 12. Therefore, at the time of thermo-sensitive transfer, the thermo-sensitive transfer property of the thermo-sensitive transfer ink ribbon 10 to a surface having a poor wettability is improved because the adhering property of the transfer property control layer 13 is increased. Further, the thermo-sensitive transfer ink ribbon 10 has an advantage in that defective transfer such as leakage, extension, or the like can be effectively improved and raking-up of ink by a head of a printing apparatus is satisfactorily prevented because the cohesion strength, viscosity, and hardness of the transfer property control layer 13 are made large.

Moreover, at the time of pressure-sensitive transfer in which an ink image (a transfer image) formed by thermo-sensitive transfer is transferred onto a target material when pressure is applied from the back side of a base sheet of a dry type transfer material, a predetermined ink image can be transferred from the base sheet onto the target material without remaining any part of the ink image because the cohesion strength and hardness of the transfer property control layer 13 are made large, so that a clear image of the transferred ink having no extension and leakage can be formed and the transferred image is protected so as to be firmly fixed.

Such a transfer property control layer 13 as described above is mainly composed of a mixture of: one or more kinds of resin such as ethylene-vinyl acetate copolymers, polyvinyl acetate, ionomers, acrylic polymers, ethylene-ethylacrylate copolymers, ethylene-acrylic acid copolymers, vinyl chloride-vinyl acetate copolymers, polyvinyl butyral, polyvinyl pyrrolidone, polyvinyl alcohol, polyamide, ethylcellulose, etc., having an excellent film forming property and a large thermo-sensitive adhering property; and one or more kinds of resin such as petroleum resin, rosin, hydrogenated rosin, rosin ester, ketone resin, phenol resin, etc., having a large cohesion strength and a tackiness applying property. The foregoing thermo-sensitive adhesive resin and the foregoing resin having a tackiness applying property are mixed with each other at a ratio within a range of from 1:0.5 to 1:10 by weight, preferably within a range of from 1:0.8 to 1:7 by weight.

The thermo-sensitive adhesive resin of an excellent film forming property constituting the transfer property control layer 13 is arrange so as not to be compatible with the ink layer 12 or so as not to be easily mixed with the ink layer 12 even if the thermo-sensitive adhesive resin is compatible with the ink layer 12, so that an excellent thermo-sensitive adhesive film is formed on the ink layer 12. The resin having a tackiness applying property, on the other hand, is compounded in the transfer property control layer 13 so that the resin having an excellent film forming property satisfactorily adheres with the ink layer 12 to increase the cohesion strength, hardness, and tackiness property of the transfer property control layer 13 to adjust the thermo-sensitive transfer property of the thermo-sensitive transfer ink ribbon 10.

In order to control the film strength of the transfer property control layer 13 to obtain a clearly sharp printed image or in order to prevent generation of stains or blocking, a filler such as kaolin, talc, bentonite, titanium oxide, or the like, or organic or inorganic particles of metallic soap such as zinc stearate, aluminum stearate, or the like, may be compounded in the transfer property control layer 13 so as to exist therein within a range not larger than 20 weight percent.

Further, as a thermal sensitivity improving agent for controlling the melting point and fusion viscosity of the transfer property control layer 13 so as to improve the thermal sensitivity thereof, one or more kinds of matters selected from the following agents may be compounded in the transfer property control layer 13.

(1) A wax agent composed of one or more kinds of matters selected from: vegetable wax such as candelilla wax, carnauba wax, rice wax, Japan wax, etc.; animal wax such as beeswax, lanolin, whale wax, etc.; mineral wax such as montan wax, ceresin, etc.; petroleum wax such as paraffin wax, micro-crystalline wax, etc.; synthetic wax such as polyethylene wax etc.; and resin wax such as $\alpha$-olefin-maleic anhydride copolymers etc.

(2) A plasticizer composed of one or more kinds of matters selected from: phosphoric ester such as tributyl phosphate, triphenyl phosphate, etc.; phthalate ester such as dimethyl phthalate, di-n-octyl phthalate, etc.; aliphatic monobasic ester such as butyl oleate, etc.; aliphatic dibasic ester such as dibutyl adipate, etc.; and dihydric alcohol ester such as diethylene glycol dibenzoate, etc.

(3) Fats and/or an oil agent composed of one or more kinds of matters selected from: vegetable or animal oil, for example, drying oil such as linseed oil, tung oil, etc.; semidrying oil such as soybean oil, cotton seed oil, rapeseed oil, etc.; and nondrying oil such as groundnut oil, olive oil, camellia oil, castor oil, etc.; fatty acid such as palmitic acid, stearic acid, oleic acid, behenic acid, etc.; higher alcohol; and polyhidric alcohol.

(4) A surfactant composed of one or more kinds of matters selected from an anion active agent, a cation active agent, a nonionic active agent, and a dipolar ion active agent.

The above-mentioned thermal sensitivity improving agent is compounded in the transfer property control layer 13 at a rate within a range of from 2 to 50 weight portions relative to 100 weight portions of the thermo-sensitive adhesive resin having an excellent film forming property and the resin having a tackiness applying property.

Further, in order to improve the shelf life and running property of the ink ribbon, a lubricant or a high molecular surface modifier may be compounded in the transfer property control layer 13 at a rate within a range of from 0.05 to 10 weight portions relative to 100 weigh portions of two or more kinds of resin constituting the transfer property control layer 13.

As the lubricant, used is one or more kinds of matters selected from: higher alcohol such as stearyl alcohol, etc.; glycerol ester such as stearic acid monoglyceride, etc.; sorbitan ester such as sorbitan monostearate, sorbitan monoparumitate, etc.; higher fatty acid such as stearic acid, etc.; fat and oil wax such as hardening castor oil, etc.; monoamide such as stearic acid amide, etc.; bisamide such as ethylene bisstearic acid amide, etc.; ester such as butyl stearate, etc.; and oxyfatty acid such as 12 hydroxy stearic acid, etc.

As the high molecular surface modifier, used is one or more kinds of matters selected from fluorine polymers, silicone polymers, and the like.

The thus obtained ink ribbon 10 is set in a printing apparatus such as a thermo-sensitive transfer printer or the like, in which the shapes of head heating resistor elements, the positions of head heating resistor elements, the angle of head mounting, the head pressing force, the taking-up torque, the head application energy, the printing speed, etc., have been adjusted, and printing and thermo-sensitive transfer are carried out by using the thermal transfer printer, so that a target dry type transferring material can be effectively produced.

That is, by using such an ink ribbon 10 as described above, a satisfactorily printed image can be realized without causing any problems of extension, leakage, unsuitable light and shade, raking-up of ink by a head, stringiness, orange peel, defective transfer, etc., even if a transfer image of desired characters, figures, or the like, is thermally printed onto a film or base sheet having a surface of poor wettability.

Then, if the thus printed image on the film or base sheet as described above is subject to pressure-sensitive transfer onto a target material such as paper, a plastic sheet, or the like, by means of pressure applied to the back of the film or base sheet, an excellent image firmly stuck on the target material and having no leakage, no extension, or no fragility can be obtained, with no remainder ink existing on the film or base sheet.

In order to produce the thermo-sensitive transfer ink ribbon according to the present invention, first, an ink liquid is prepared in the form of a solution in which a coloring agent, a binder agent, and a pressure-sensitive adhesive are mixed with each other at a ratio of 5–30:–40–93:2–30 is dissolved or dispersed in one or more kinds of suitable solvents, for example, selected from: aromatic hydrocarbon such as benzene, toluene, xylene, etc.; aliphatic hydrocarbon such as pentane, hexane, heptane, etc.; ketone such as acetone, methyl ethyl ketone, methyl isobutyl ketone, etc.; ester such as ethyl acetate, butyl acetate, etc.; alcohol such as methanol, ethanol, propanol, etc.; and chrolinated hydrocarbon such as dichloroethane, trichloroethane, trichloroethylene, etc. Then, the thus prepared ink liquid is applied to a target film-like ribbon substrate material 11 through a known process.

Further, a mixture in which the thermo-sensitive adhesive resin having an excellent film forming property and the resin having a tackiness applying property are mixed with each other at a ratio within a range of from 1:0.5 to 1:10 in the state where the thermo-sensitive adhesive resin having an excellent film forming property and the resin having a tackiness applying property are dissolved or dispersed in water or in a generally-used organic solvent which does not harm the ink layer 12, is applied to the surface of the ink layer 12 to a predetermined thickness through an ordinary coating process to thereby form the transfer property control layer 13 on the ink layer 12. The thus formed transfer property control layer 13 has viscosity higher than that of the ink layer 12 in the condition of thermo-sensitive transfer, the viscosity being generally selected to be not lower than 3,000 cP, preferably not lower than 10,000 cp, at a temperature of 95° C.

Next, description will be made hereunder as to a preferred embodiment of the method of producing the thermo-sensitive transfer ink ribbon according to the present invention.

First, a predetermined quantity of an ink compound having a predetermined composition ratio is heated so as to be dissolved in a solvent and then cooled so as to produce deposition. In the process of deposition, it is preferable to perform cooling while agitating the solution so as to decrease the size of deposited crystal particles.

Next, the coloring agent and the foregoing deposited ink component are finely dispersed by means of a known pulverizing mill, for example, a ball mill, a sand mill, an attrition mill, a high speed impeller grinder, a high speed impact mill, or the like, to form an ink liquid. At this time, the coloring agent may be dispersed in a solvent by ultrasonic dispersion or the like in advance, or the coloring agent may be treated with a dispersing agent so as to improve the dispersing property of the cooling agent in the ink.

In the ink ribbon formed by using the thus produced ink liquid, the cohesion strength of the ink can be reduced because resin having large cohesion strength can be dispersed in the form of fine particles. Therefore, even in the case of using resin or wax having high viscosity and large cohesion and adhesion strength in comparison with an ink ribbon formed by hot melt coating is used, transfer can be performed with the same energy as that required in the case of using such a ink ribbon formed by hot melt coating. The ink ribbon formed by using the ink liquid produced through the process as described above is advantageous in performing transfer particularly onto a surface having poor wettability and a good mold-releasing property because the ink component having large adhesion and cohesion strength and high viscosity is used. That is, it is remarkably improve such a problem in that defective transfer is caused because of insufficient adhesion strength onto a surface of poor wettability, transferred ink is crushed to be spread, or the printed ink is thinly extended to thereby reduce the concentration, which problem has been caused in the case of using conventional ink having small adhesion and cohesion strength and low viscosity. Further, when an ink image which has been formed through thermo-sensitive transfer onto a surface having a poor wettability is to be transferred again to another material by pressure, the ink image can be entirely transferred because the cohesion strength of the ink ribbon is relatively large. Thus, the transfer can be performed clearly.

EXAMPLES

The present invention will be understood more readily with reference to the following examples; however, those examples are intended to illustrate the present invention and are not to to be construed to limit the scope of the invention.

Further, it is further understood by those skilled in the art that various changes, modifications and improvements may be made in the present invention based on the knowledge of those skilled in the art other than those embodiments illustrated above and those examples illustrated hereunder, without departing from the spirit and scope of the present invention.

EXAMPLE 1

In order to form the ink layer 12 and the transfer property control layer 13, ink and a coating liquid respectively having the following compositions were prepared. The method of preparing the ink was as follows.

First, ink components except carbon black were heat-dissolved in a solvent. The thus obtained solution was cooled while agitating so as to obtain fine deposition material. Next, carbon black was dispersed in a solvent with ultrasonic energy, and the thus obtained solution and the foregoing fine deposition of ink components were dispersed by using a ball mill for 24 hours to thereby form an ink liquid. The viscosity of the ink layer 12 formed with the thus prepared ink liquid was 320 cP (95° C.), and the viscosity of the transfer property control layer 13 formed by the coating liquid was within a range of from 60,000 cP to 80,000 cP (95° C.).

| Composition of Ink Layer 12 | Weight portion |
|---|---|
| α-olefin-maleric anhydride copolymers (DIACARNA 30 produced by Mitsubishi Chemical Industries, Ltd.) | 2 |
| Candelilla wax (CANDELILLA WAX 2698 produced by Chukyo Yushi Co., Ltd.) | 3 |
| Paraffin wax (HNP-101 produced by Nippon Seiro Co., Ltd.) | 9 |
| Rosin ester (SUPER ESTER A-100 produced by Arakawa Chemical Industries Co., Ltd.) | 2 |
| Ethylene-vinyl acetate copolymers (EVA210 produced by Du Pont-Mitsui Polychemicals Co., Ltd.) | 2 |
| Carbon black (MA-7 produced by Mitsubishi Chemical Industries, Ltd.) | 2 |
| Methyl isobutyl keton (solvent) | 100 |
| **Composition of Transfer Property Control Layer 13** | **Weight portion** |
| Polyamide (SANAMIDE 615A produced by Sanwa Chemical Industries Co., Ltd. | 12 |
| Hydrogenated rosin (HYPALE produced by Arakawa Chemical Industries Co., Ltd.) | 8 |
| Titanium oxide (TIPAQUE A-100 produced by Ishihara Sangyo Co. Ltd.) | 2 |
| Stearic acid amide (AMAID S produced by Kao Corporation Ltd.) | 1 |
| Isopropyl alcohol (solvent) | 207 |

As the ribbon substrate material 11, a polyethylene terephthalate (PET) film having a thickness of 3.5 μm was used. The PET film was coated with the ink having the foregoing composition so that a film thickness thereof after dried became 6–7 μm, and dried to form the ink layer 12. Further, the ink layer 12 was coated with the coating liquid for the transfer property control layer 13 having the foregoing composition so that a film thickness thereof after dried was 1–2 μm, and then dried. Thus, the aimed ink ribbon 10 was obtained.

Next, the thus obtained ink ribbon was set in an adjusted thermo-sensitive transfer typewriter (EP-43 produced by Brother Industries Ltd.). When printing was performed on a polyethylene film (having a thickness of 100 μm) coated with silicone resin by using the thermo-sensitive transfer typewriter, a sufficiently clear printed image having an excellent quality could be obtained. Further, when the printed image was subject to pressure-sensitive transfer onto a surface of a desired sheet of paper, of plastic material or of metal by applying pressure by rubbing the back of the foregoing printed polyethylene film, an image having a sufficiently excellent quality could be realized on the surface of the desired sheet.

EXAMPLE 2

An ink ribbon 10 was produced by using ink and a coating liquid respectively having the following compositions for the ink layer 12 and for the transfer property control layer 13 in the same manner as in the Example 1. As a result of thermo-sensitive transfer test, it was found that a clear printed image having an excellent quality could be obtained. Further, the printed image could be subject to pressure-sensitive transfer onto a desired target material as a good quality image. The viscosity of the ink layer 12 formed of the ink having the following composition was 700 cP (95° C.) and the viscosity of the transfer property control layer 13 formed of the coating liquid having the following composition was in a range of from 50,000 cP to 70,000 cP (95° C.).

| Composition of Ink Layer 12 | Weight portion |
|---|---|
| α-olefin-maleric anhydride copolymers (DIACARNA 30 produced by Mitsubishi Chemical Industries, Ltd.) | 8 |
| Candelilla wax (CANDELILLA WAX 2698 produced by Chukyo Yushi Co., Ltd. | 5 |
| Rosin ester (SUPER ESTER A-100 produced by Arakawa Chemical Industries Co., Ltd.) | 2 |
| Ethylene-vinyl acetate copolymers (EVA210 produced by Du Pont-Mitsui Polychemicals Co., Ltd.) | 3 |
| Carbon black (MA-7 produced by Mitsubishi Chemical Industries, Ltd.) | 2 |
| Methyl isobutyl keton (solvent) | 70 |
| Toluene | 30 |

| Composition of Transfer Property Control Layer 13 | Weight portion |
|---|---|
| Polyamide (SANAMIDE 615A produced by Sanwa Chemical Industries Co., Ltd.) | 21 |
| Hydrogenated rosin (HYPALE produced by Arakawa Chemical Industries Co., Ltd.) | 21 |
| High molecular surface modifier (MODIPER F-100 produced by Nippon Oils & Fats Co., Ltd.) | 8 |
| Isopropyl alcohol (solvent) | 450 |

EXAMPLE 3

An ink ribbon was formed in the same manner as in the Example 1 by using the ink having the same composition as that of the Example 1 for forming the ink layer 12 and a coating liquid having the following composition for forming the transfer property control layer 13. Good results could be obtained in the same thermo-sensitive transfer test and the same pressure-sensitive transfer test as those of the Example 1.Further, the viscosity of the transfer property control layer 13 formed by the coating liquid having the following composition was within a range of from 60,000 cP to 80,000 cP (95° C.).

| Composition of Transfer Property Control Layer 13 | Weight portion |
|---|---|
| Polyamide (SANAMIDE 615A produced by Sanwa Chemical Industries Co., Ltd.) | 1 |
| Rosin ester (SUPER ESTER A-100 produced by Arakawa Chemical Industries Co., Ltd.) | 1 |
| Toluene | 19 |
| Isopropyl alcohol | 19 |

COMPARATIVE EXAMPLE 1

Although the same ink for forming the ink layer 12 and the same coating liquid for forming the transfer property control layer 13 as those of the Example 1 were used, the ink was prepared through hot-melt process. An ink ribbon was produced through hot-melt coating of the ink. The same transfer test as that of the Example 1 was performed by using the ink ribbon. The method of preparing the ink is as follows.

First, the ink components except carbon black were heat-dissolved, and sufficiently mixed with each other. Thereafter, carbon black was added to the thus obtained solution and sufficiently finely dispersed by using a three-roll mill to thereby form ink. The, an ink ribbon is produced by performing hot met coating with the ink. As a result of transfer test, the cohesion strength in the ink in thermo-sensitive transfer operation was so strong that the quantity of transfer became insufficient, or that the adhesion strength onto the target transferring sheet became so insufficient that the transferred image was removed from the sheet only by slight, or that stringiness, hair, or the like were caused to make the transferred image dull or to cause dropping-off of grainning.

As has been apparent from the foregoing detailed description, according to the present invention, it have been made possible to make a coating on an ink ribbon substrate material with ink of relatively high viscosity and relatively large cohesion strength in the state of fine particle, so that it becomes possible to carry out excellent thermal-sensitive transfer onto a surface having poor wettability and good mold-releasing property without increasing any load to a thermal-sensitive transfer apparatus, and it becomes possible to carry out excellent pressure-sensitive transfer from the surface having poor wettability onto any other sheet.

What is claimed is:

1. A thermo-sensitive transfer ink ribbon to be used for producing a dry type transfer material comprising:

a ribbon substrate material;

an ink layer formed on one of opposite surfaces of said substrate material, said ink layer comprising a mixture of fine particles of a coloring agent, a binder and a pressure-sensitive adhesive; and a transfer property control layer formed on said ink layer and containing a thermo-sensitive adhesive and a tackiness agent.

2. A thermo-sensitive transfer ink ribbon according to claim 1, in which a sticking prevention layer composed of heat-resistant resin is formed on the other surface of said ribbon substrate material opposite to said one surface coated with said ink layer.

3. A thermo-sensitive transfer ink ribbon according to claim 1 or 2, in which said ribbon substrate material is formed of a material having a heat-resistant temperature not lower than 150° C.

4. A thermo-sensitive transfer ink ribbon according to claim 3 wherein said ribbon substrate material is selected from the group consisting of polyester resin film, polyimide resin film, polycarbonate resin film, polysulfone resin film, polyethersulfone resin film, polyphenylene-sulfite resin film, condenser paper and glassine paper.

5. A thermo-sensitive transfer ink ribbon according to claim 1 or 2, in which said ribbon substrate material has a thickness within a range of from 3 μm to 20 μm.

6. A thermo-sensitive transfer ink ribbon according to claim 1 or 2, in which said binder agent consists essentially of:

wax and a tackiness agent, said wax and said tackiness agent being mixed with each other at a ratio within a range of from 15:1 to 3:2 by weight.

7. A thermo-sensitive transfer ink ribbon in accordance with claim 6 wherein said wax comprises a vegetable wax selected from the group consisting of candelilla wax, carnauba wax, rice wax and Japan wax.

8. A thermo-sensitive transfer ink ribbon in accordance with claim 6 wherein said wax comprises an animal wax selected from the group consisting of beeswax, lanolin, and whale wax.

9. A thermo-sensitive transfer ink ribbon in accordance with claim 6 wherein said wax comprises a mineral wax selected from the group consisting of montan wax and ceresin.

10. A thermo-sensitive transfer ink ribbon in accordance with claim 6 wherein said wax comprises a petroleum wax selected from the group consisting of paraffin wax and microcrystalline wax.

11. A thermo-sensitive transfer ink ribbon in accordance with claim 6 wherein said tackiness agent is selected from the group consisting of petroleum resin, rosin resin, ketone resin, polyamide resin, and phenol resin.

12. A thermo-sensitive transfer ink ribbon according to claim 1 or 2, in which said pressure-sensitive adhesive consists of one or more materials selected from a group consisting of: vinyl macromolecules, fiber macromolecules and rubber macromolecules.

13. A thermo-sensitive transfer ink ribbon in accordance with claim 12 wherein said vinyl macromolecules are selected from a group consisting of polyvinyl chloride, polyacrylic ester, ethylene-vinyl acetate copolymers, ethylene-ethylacrylate copolymers, polyvinyl acetate, polyvinyl ether, polyvinyl acetal, and polyisobutylene.

14. A thermo-sensitive transfer ink ribbon in accordance with claim 12 wherein said fiber macromolecules are selected from a group consisting of ethylcellulose, nitrocellulose and cellulose acetate.

15. A thermo-sensitive transfer ink ribbon in accordance with claim 12 wherein said rubber macromolecules are selected from a group consisting of chlorinated rubber and natural rubber.

16. A thermo-sensitive transfer ink ribbon according to claim 1 or 2, in which said coloring agent, said binder agent, and said pressure-sensitive adhesive are mixed with each other at a ratio of 5–30:40–93:2–30 by weight.

17. A thermo-sensitive transfer ink ribbon according to claim 1 or 2, in which said thermo-sensitive adhesive comprises at least one material selected from the group consisting of ethylene-vinyl acetate copolymers, polyvinyl acetate, ionomers, acryl polymers, ethylene-ethylacrylate copolymers, ethylene-acrylic acid copolymers, vinyl chloride-vinyl acetate copolymers, polyvinyl butyral, polyvinyl pyrrolidone, polyvinyl alcohol, polyamide, and ethylcellulose.

18. A thermo-sensitive transfer ink ribbon according to claim 1 or 2, in which said tackiness agent comprises at least one material selected from the group consisting of petroleum resin, rosin, hydrogenated rosin, rosin ester, ketone resin, and phenol resin.

19. A thermo-sensitive transfer ink ribbon according to claim 1 or 2, in which said thermo-sensitive adhesive and said tackiness agent are mixed with each other at a ratio within a range of from 1:0.5 to 1:10 by weight.

20. A thermo-sensitive transfer ink ribbon according to claim 1 further comprising a filler included in said transfer property control layer by an amount not greater than 20 percent by weight.

21. A thermo-sensitive transfer ink ribbon according to claim 20 wherein the filler is selected from a group consisting of kaolin, talc, bentonite, titanium oxide, and metallic soap.

22. A thermo-sensitive transfer ink ribbon according to claim 21 wherein the metallic soap comprises zinc stearate or aluminum stearate.

23. A thermo-sensitive transfer ink ribbon according to claim 20 wherein said transfer property control layer further comprises a thermo-sensitivity improving agent at a ratio of 2–50 weight portions of said thermo-sensitivity improving agent to 100 weight portions of said thermo-sensitive adhesive and said tackiness agent.

24. A thermo-sensitive transfer ink ribbon according to claim 23 wherein said transfer property control layer further comprises a lubricant at a ratio of 0.05–10 weight portions of said lubricant to 100 weight portions of said thermo-sensitive adhesive and said tackiness agent.

25. A thermo-sensitive transfer ink ribbon according to claim 2 further comprising a filler included in said transfer property control layer by an amount not greater than 20 percent by weight.

26. A thermo-sensitive transfer ink ribbon according to claim 25 wherein the filler is selected from a group consisting of kaolin, talc, bentonite, titanium oxide, and metallic soaps.

27. A thermo-sensitive transfer ink ribbon according to claim 26 wherein the metallic soap comprises zinc stearate or aluminum stearate.

28. A thermo-sensitive transfer ink ribbon according to claim 25 wherein said transfer property control layer further comprises a thermo-sensitivity improving agent at a ratio of 2–50 weight portions of said thermo-sensitivity improving agent to 100 weight portions of said thermo-sensitive adhesive and said tackiness agent.

29. A thermo-sensitive transfer ink ribbon according to claim 28 wherein said transfer property control layer further comprises a lubricant at a ratio of 0.05–10 weight portions of said lubricant to 100 weight portions of said thermo-sensitive adhesive and said tackiness agent.

*30. A thermo-sensitive transfer ink ribbon according to claim 1, wherein the transfer property control layer further contains talc or titanium dioxide in an amount no greater than 20% by weight.*

*31. A thermo-sensitive transfer ink ribbon in which an image is transferred onto a sheet or film upon the application of heat, said ribbon comprising:*

*a base film;*

*an ink layer in contact with said base film and a transfer property control layer disposed over said ink layer, said ink layer containing a colorant, a binder and a pressure-sensitive adhesive; and*

*said transfer property control layer containing a thermoplastic resin and a tackifying resin, and having a higher viscosity under a condition of thermo-sensitive transfer, heat sensitive adhesiveness, cohesive strength and hardness than said ink layer.*

*32. A thermo-sensitive transfer ink ribbon according to claim 31, wherein the transfer property control layer further contains talc or titanium dioxide in an amount no greater than 20% by weight.*

*33. A thermo-sensitive transfer ink ribbon in which an image is transferred onto a sheet or film upon the application of heat, said ribbon comprising:*

*a base film;*

*an ink layer in contact with said base film and a transfer property control layer disposed over said ink layer, said ink layer containing a colorant, a binder and a pressure-sensitive adhesive; and*

*said transfer property control layer containing a thermoplastic resin, a tackifying resin, and talc or titanium dioxide in an amount no greater than 20% by weight and having a higher viscosity, heat sensitive adhesiveness, cohesive strength and hardness than said ink layer.*

* * * * *